UNITED STATES PATENT OFFICE.

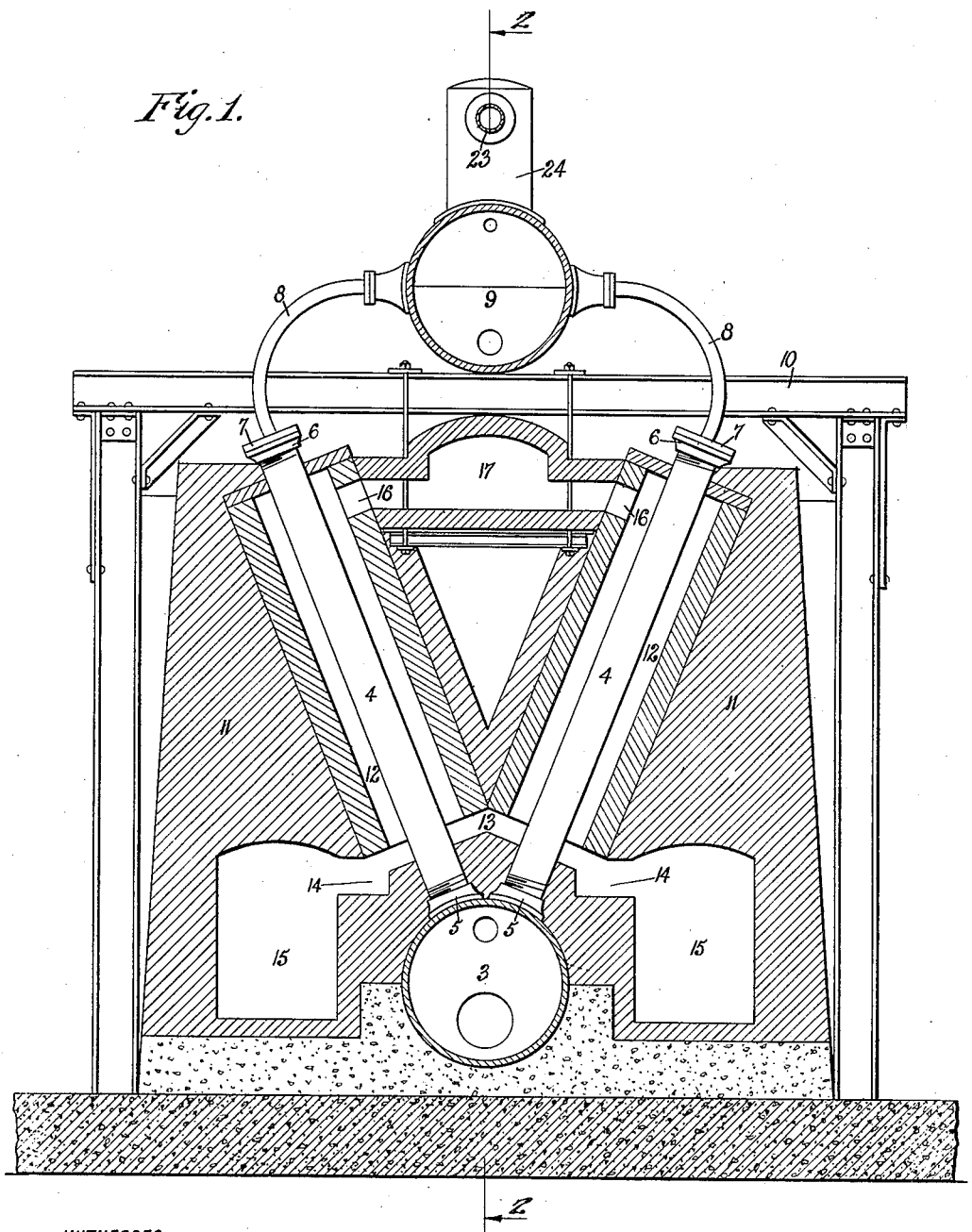

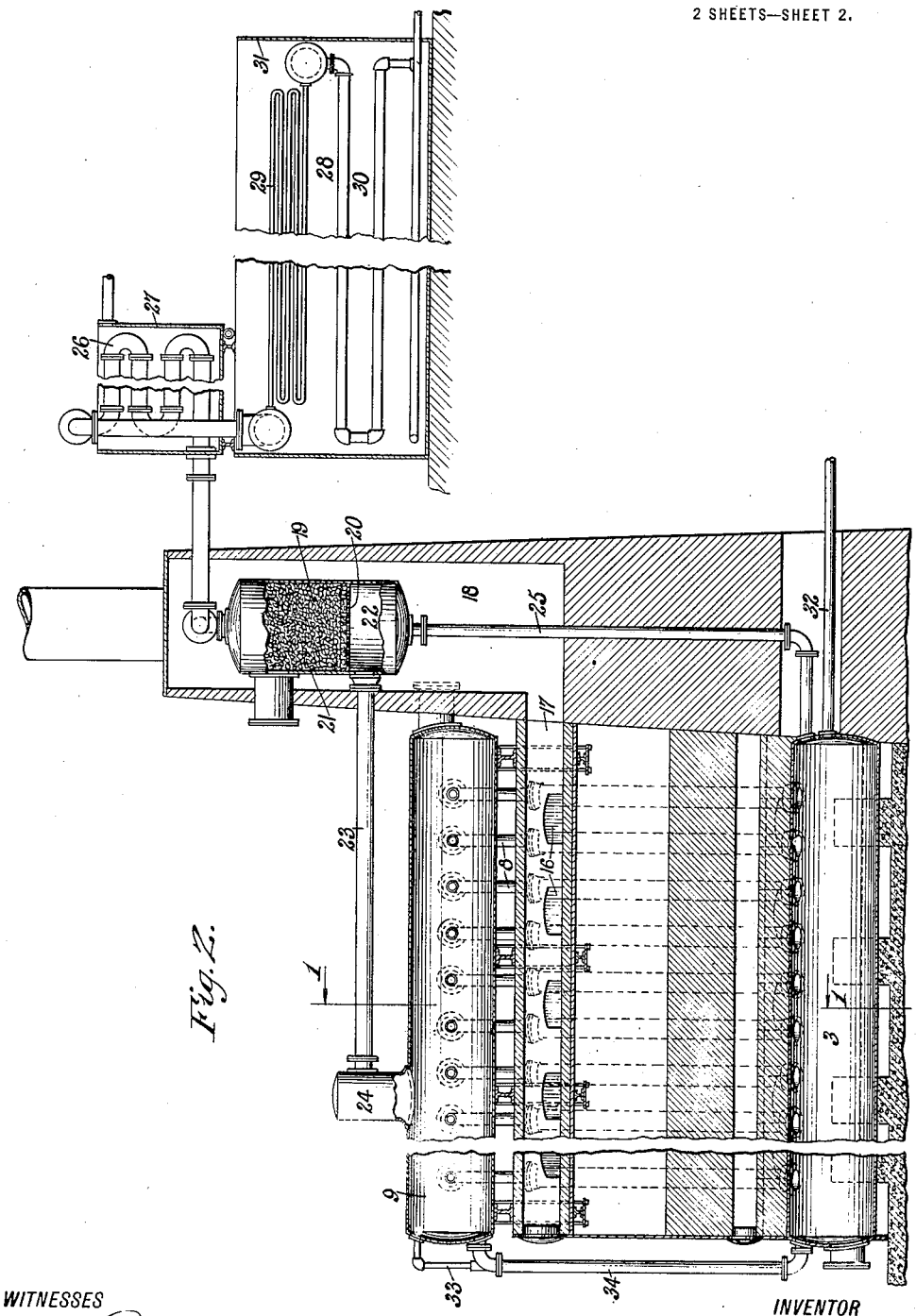

GENTRY LLOYD ROWSEY, OF HUMBOLDT, KANSAS, ASSIGNOR TO THE ROWSEY GASOLINE PROCESS CO., OF HUMBOLDT, KANSAS, A CORPORATION OF KANSAS.

STILL.

1,316,511.        Specification of Letters Patent.     Patented Sept. 16, 1919.

Application filed October 3, 1917. Serial No. 194,526.

*To all whom it may concern:*

Be it known that I, GENTRY L. ROWSEY, a citizen of the United States, and a resident of Humboldt, in the county of Allen and State of Kansas, have invented a new and Improved Still, of which the following is a full, clear, and exact description.

The object of the invention is to provide a simple and efficient still particularly adaptable for the continuous distillation of liquid hydrocarbons, whether under ordinary or high pressure and at any desired temperature.

The still is of the tubular type having arcuated sections which permit proper expansion of parts of the still submitted to different temperatures, thereby reducing strain and, therefore, damage to the still, in consequence increasing the life of the still.

Another characteristic of the still is the disposition of the heated tubes whereby the separation of the lighter and heavier hydrocarbons is facilitated.

Other characteristics of the invention will appear as the description proceeds.

In the accompanying drawings, forming part of the application, similar characters of reference indicate corresponding parts in both views.

Figure 1 is a cross section through a still embodying my invention on line 1—1, Fig. 2; and Fig. 2 is a longitudinal vertical section through the still on line 2—2, Fig. 1.

Referring to the drawings, 3 is the lower drum from which heating tubes 4 rise obliquely to spread toward the upper ends of the tubes. The tubes 4 are threaded in suitable collars 5 provided on the drum 3. The collars of the same row are in alinement. The collars of the two rows may be in staggered relation, if so desired. The upper ends of the tubes 4 are provided with flanges 6 to which the flanged ends 7 of arcuated conduits 8 are secured. Said conduits 8 are preferably of a smaller diameter than the tubes 4 and thereby will flex easily without strain on the joints between said conduits 8 and the upper drum 9. It will be noted that each of the tubes 4 has a conduit 8 so that the expansion of each of the tubes is independent and does not affect any of the other tubes or the drum 9.

The drum 9 is supported by a suitable framework 10 which surrounds the brickwork of a furnace 11. The brickwork provides passages 12 which house each row of tubes 4, the two passages 12 entering a common channel 13 in the lower end thereof which communicates by a series of passages 14 with fireplaces 15 provided on each side of the lower drum, which drum is embedded in the brickwork of the furnace 11 and thereby insulated from the direct heat of the fireplaces. The fire in the fireplaces 15 may be generated by liquid hydrocarbon or gaseous fuel, if so desired. The upper ends of the passages 12 are in communication by a series of passages 16 with a duct 17 leading to a flue 18.

A separator or dephlegmator 19 is positioned in the flue so that the bottom of same is above the upper drum 9. A perforated plate 20 divides the separator into upper and lower parts 21 and 22 respectively, the lower part 22 being connected by a conduit 23 to the dome 24 of the upper drum 9. The conduit 23 leads the vapors from the drum to the separator.

The upper part 21 of the separator is adapted to carry rock or mineral wool, or similar material, which offers a resistance to the flow of gases and presents a very large surface on which the gas will easily deposit any liquid parts carried thereby or that may condense during the passage of the gas through the separator. The bottom of the separator is also connected to the lower drum by a conduit 25, so that any liquid accumulated in the part 22 will be returned to the lower drum. The top of the separator is connected to a condenser coil 26 about which a cooling medium may be circulated in a tank 27. The coil 26 discharges the uncondensed part to a secondary coil 28. The part that has been condensed within the coil 26 will flow back to the separator and drip through the obstructions therein into the lower part, from where it is returned to the lower drum.

The secondary condenser coil 28 is formed of two sections 29 and 30 located in the same tank 31. The section 29 is of a smaller diameter than the section 30, so that there is a possibility of expansion between the two coil sections. The section 30 is further reduced in diameter near its outlet end so that there will be a contraction from the inlet to the outlet end of the section 30, while there is a chance for expansion between the sections 29 and 30.

Liquid hydrocarbon is supplied continuously to the lower drum through a conduit 32. The level of liquid within the still is maintained constant, preferably on a diametrical line of the upper drum 9. The liquid level is indicated by a gage 33. The two drums are also connected in the front by a conduit 34. The liquid supplied to the lower drum rises through the inclined heated tubes 4 and conduits 8 into the upper drum. The liquid on its way through the tubes 4 is heated by the hot gases circulating through the passages 12 which house the tubes. The heat applied to the tubes breaks up the liquid into heavier and lighter parts, the heavier parts clinging to the outer sides of the tube and tending to descend into the lower drum 3 where they settle at the bottom. The gaseous parts, on the other hand, follow the inner sides of the tube 4, rising through the conduits 8 into the drum 9, and from there they pass to the separator where any liquid entrained by the vapors will be retained and returned through the conduit 25 to the lower drum. It will be noted that the conduit 32 supplies the liquid to the upper part of the lower drum and thereby does not disturb any sediment within said drum.

The arcuated conduits 8 allow full expansion of the tubes 4 under the action of heat without straining the joints of said tubes or conduits with the drums. The flanged upper ends 6 of the tubes being outside of the brick-work permits easy separation of the conduits from the tubes and, therefore, the cleaning of said tubes from any sediment that may adhere thereto. This arrangement also permits the easy separation of the tubes 4 from the lower drum, the tubes being in threaded connection with said lower drum, as previously mentioned; thus, damaged tubes can be easily replaced without injuring the brick-work about the tubes.

The separator being located in the flue is subjected to the heat of the outflowing burned-up gases, in consequence preheating any liquid matter which accumulates therein or is returned thereto from the primary condenser coil before it is returned to the lower drum. The liquid in the lower drum is also preheated by the heavier hydro-carbons which have broken away from the lighter hydrocarbons in the tubes 4.

While the described structure is my preferred form of still, I desire to have it understood that the structure shown is merely illustrative and that such changes may be made as are within the scope of the appended claims.

I claim:

1. In an apparatus of the class described, an upper drum, a lower drum, rising tubes from the lower drum to the upper drum, said rising tubes diverging toward the upper end thereof, arcuate conduits of lesser diameter than the tubes connecting each of the tubes to the side of the upper drum, and means for circulating heat about the tubes only.

2. An apparatus of the class described comprising a lower drum, an upper drum, heating tubes rising obliquely from the lower drum so as to diverge toward the upper end of said tubes and disposed to be subjected to direct external heat, and arcuate conduits detachably connected to each of the tubes and to the upper drum, and disposed so as not to be subjected to external heat.

GENTRY L. ROWSEY.